United States Patent
Burow et al.

(10) Patent No.: US 9,914,459 B2
(45) Date of Patent: Mar. 13, 2018

(54) VEHICLE DRIVE CONTROL

(71) Applicant: Audi AG, Ingolstadt (DE)

(72) Inventors: Clemens Burow, München (DE); Florian Then, Ingolstadt (DE)

(73) Assignee: Audi AG, Ingolstadt (DE)

( * ) Notice: Subject to any disclaimer, the term of this patent is extended or adjusted under 35 U.S.C. 154(b) by 110 days.

(21) Appl. No.: 14/912,341

(22) PCT Filed: Aug. 2, 2014

(86) PCT No.: PCT/EP2014/002136
§ 371 (c)(1),
(2) Date: Feb. 16, 2016

(87) PCT Pub. No.: WO2015/024632
PCT Pub. Date: Feb. 26, 2015

(65) Prior Publication Data
US 2016/0185352 A1 Jun. 30, 2016

(30) Foreign Application Priority Data

Aug. 20, 2013 (DE) .................. 10 2013 013 860

(51) Int. Cl.
*B60W 30/188* (2012.01)
*B60W 20/10* (2016.01)
(Continued)

(52) U.S. Cl.
CPC ............. *B60W 30/188* (2013.01); *B60K 6/34* (2013.01); *B60K 6/44* (2013.01); *B60K 6/48* (2013.01);
(Continued)

(58) Field of Classification Search
None
See application file for complete search history.

(56) References Cited

U.S. PATENT DOCUMENTS 5,621,304 A * 4/1997 Kiuchi ................. B60W 30/20
290/40 C
6,098,733 A * 8/2000 Ibaraki ................. B60W 10/06
701/55
(Continued)

FOREIGN PATENT DOCUMENTS

CN 102795221 11/2012
DE 601 16 919 9/2006
(Continued)

OTHER PUBLICATIONS

Tanaka, Machine translation of JP 2013103514, May 2013, espacenet.com.*
(Continued)

*Primary Examiner* — John Olszewski
*Assistant Examiner* — David P. Merlino
(74) *Attorney, Agent, or Firm* — Henry M. Feiereisen, LLC

(57) ABSTRACT

A method for controlling a drive of a vehicle with at least one first axle having at least one mounted wheel. A drive torque is specified by a driver of the vehicle, and the first axle is driven by means of a first electric machine dependent on the drive torque. A second electric machine which is coupled to an internal combustion engine provides electrical energy for driving the first axle with the first electric machine. A respective control or target torque assigned to the second electric machine and the internal combustion engine is computed while taking into consideration the drive torque and machine parameters of at least the second electric machine. The second electric machine and the internal combustion engine are each regulated with respect to the assigned control torque or with respect to the assigned target torque.

10 Claims, 2 Drawing Sheets

(51) Int. Cl.
*B60W 10/06* (2006.01)
*B60W 10/08* (2006.01)
*B60K 6/34* (2007.10)
*B60K 6/44* (2007.10)
*B60K 6/52* (2007.10)
*B60W 20/13* (2016.01)
*B60W 20/15* (2016.01)
*B60K 6/48* (2007.10)
*B60L 11/14* (2006.01)
*B60L 11/18* (2006.01)
*B60L 15/20* (2006.01)

(52) U.S. Cl.
CPC ............ *B60K 6/52* (2013.01); *B60L 11/14* (2013.01); *B60L 11/1803* (2013.01); *B60L 15/2045* (2013.01); *B60W 10/06* (2013.01); *B60W 10/08* (2013.01); *B60W 20/10* (2013.01); *B60W 20/13* (2016.01); *B60W 20/15* (2016.01); *B60L 2220/42* (2013.01); *B60L 2240/423* (2013.01); *B60W 2540/10* (2013.01); *B60W 2710/0666* (2013.01); *B60W 2710/083* (2013.01); *B60Y 2200/92* (2013.01); *B60Y 2300/188* (2013.01); *B60Y 2300/43* (2013.01); *B60Y 2300/60* (2013.01); *B60Y 2300/78* (2013.01); *Y02T 10/623* (2013.01); *Y02T 10/6265* (2013.01); *Y02T 10/6286* (2013.01); *Y02T 10/645* (2013.01); *Y02T 10/648* (2013.01); *Y02T 10/70* (2013.01); *Y02T 10/7005* (2013.01); *Y02T 10/7077* (2013.01); *Y02T 10/72* (2013.01); *Y02T 10/7283* (2013.01); *Y10S 903/916* (2013.01); *Y10S 903/93* (2013.01)

(56) References Cited

U.S. PATENT DOCUMENTS

| | | | |
|---|---|---|---|
| 6,278,915 B1* | 8/2001 | Deguchi | B60W 20/11 701/22 |
| 6,470,985 B1* | 10/2002 | Inada | B60W 10/06 180/309 |
| 6,784,563 B2 | 8/2004 | Nada | |
| 6,845,305 B1* | 1/2005 | Raftari | B60W 10/06 701/22 |
| 7,004,018 B2 | 2/2006 | Kadota et al. | |
| 2001/0039230 A1* | 11/2001 | Severinsky | B60W 20/15 477/3 |
| 2002/0183161 A1 | 12/2002 | Charaudeau et al. | |
| 2003/0102673 A1* | 6/2003 | Nada | B60W 20/10 180/65.235 |
| 2004/0204291 A1* | 10/2004 | Atarashi | B60W 30/1884 477/183 |
| 2007/0205741 A1* | 9/2007 | Kaneko | B60W 10/06 318/801 |
| 2007/0227792 A1* | 10/2007 | Yonemori | B60W 20/15 180/65.31 |
| 2009/0115358 A1 | 5/2009 | Kachi et al. | |
| 2011/0276207 A1* | 11/2011 | Falkenstein | B60W 20/00 701/22 |
| 2013/0204473 A1 | 8/2013 | Then et al. | |
| 2013/0211640 A1 | 8/2013 | Maier et al. | |
| 2014/0136035 A1* | 5/2014 | Boskovitch | B60W 20/00 701/22 |
| 2014/0309831 A1* | 10/2014 | Tanaka | B60W 20/50 701/22 |
| 2015/0336565 A1* | 11/2015 | Yamazaki | B60W 30/1882 701/22 |

FOREIGN PATENT DOCUMENTS

| | | |
|---|---|---|
| DE | 603 12 445 | 12/2007 |
| DE | 102008049225 | 4/2010 |
| DE | 102010015423 | 10/2011 |
| DE | 102011004862 | 8/2012 |
| EP | 1 157 873 | 11/2001 |
| EP | 1 393 951 | 3/2004 |
| JP | 2013103514 * | 5/2013 |
| WO | WO 2013/076566 | 5/2013 |

OTHER PUBLICATIONS

International Search Report issued by the European Patent Office in International Application PCT/EP2014/002136 dated May 26, 2015.
Chinese Search Report dated Apr. 25, 2016 with respect to counterpart Chinese patent application 201480046079.X.
Translation of Chinese Search Report dated Apr. 25, 2016 with respect to counterpart Chinese patent application 201480046079.X.

* cited by examiner

VEHICLE DRIVE CONTROL

CROSS-REFERENCES TO RELATED APPLICATIONS

This application is the U.S. National Stage of International Application No. PCT/EP2014/002136, filed Aug. 2, 2014, which designated the United States and has been published as International Publication No. WO 2015/024632 and which claims the priority of German Patent Application, Serial No. 10 2013 013 860.4, filed Aug. 20, 2013, pursuant to 35 U.S.C. 119(a)-(d).

BACKGROUND OF THE INVENTION

The present invention relates to a method for controlling a drive of a vehicle having at least a first axle with at least one mounted wheel, wherein a drive torque is set by a driver of the vehicle and the first axle is driven by a first electric machine as a function of the drive torque, and wherein a second electric machine which is coupled to at least one combustion engine supplies electrical energy for the purpose of driving the first axle by way of the first electric machine. The invention further relates to a vehicle with a drive and to a computer program product.

Vehicles of the generic type are known in principle, so that a specific documentation is not required. Vehicles, also known as motor vehicles, are used to travel on land. When in addition to an electric machine as a drive a combustion engine is additionally provided as a drive, these vehicles are usually referred to as hybrid vehicles.

In a vehicle with a first axle that can be driven exclusively by way of a first electric machine and with a hybrid axle, i.e. a second axle, which can be operated both by way of an internal combustion engine and by way of a second electric machine, the first electric machine can be supplied from a battery of the vehicle for driving the first axle. However, the electrical energy required for the operation of the first electric machine of the first, purely electrical driven axle may also be supplied by way of the internal combustion engine via the second electric machine operating in the generator mode. This operational state is referred to for the purposes of this disclosure also as compensation. A full compensation exists when the total electrical energy required for the operation of the first electric machine is supplied by the second electric machine. Arbitrary intermediate states may be assumed between the aforementioned states, for example, in that half of the total electrical energy required for the operation of the first electric machine is supplied by the battery of the vehicle and another half by the second electric machine. The first and the second electric machines are typically rotating electric machines, such as DC motors, three-phase motors or the like.

The electric machines are typically each driven by a respective inverter, which enables electrical energy to be converted between the respective electric machine and an intermediate circuit, to which the respective inverter is connected. Usually the intermediate circuit is formed by a DC-link circuit, to which at the same time the battery of the vehicle is also connected. The battery of the vehicle is typically designed as an accumulator.

If the battery of the vehicle is in an operating condition in which it can no longer receive or supply any significant amount of electrical energy any more, then a special operating status of the drive of the vehicle is required, in which exactly the amount of electrical energy is supplied by the second electric machine that is required for the operation of the first electric machine. To load the battery as little as possible, the generated and the consumed electrical energy must be identical as much as possible. Otherwise there is a danger of overloading the vehicle's battery. Such an operation of the drive is also referred to as serial operation. This operating condition can be realized by operating the second electric machine under current control. The current is then controlled with the inverter such that the generated current is exactly equal to the consumed current.

It has been proven to be disadvantageous in serial operation that is difficult to predict the torque produced by the second electric machine when operated in generator mode under closed-loop control. In addition, fluctuations may arise when additional electrical components, in particular electrical loads, are operated in the intermediate circuit of the vehicle.

In order to adjust a target torque on the hybrid axle, the internal combustion engine must provide exactly the target torque in addition to the torque required for operating the second electric machine. The internal combustion engine must hence always be adjusted to the changing torque. This is often not possible by using the same dynamics with which the changes take place. One consequence is that corresponding fluctuations become noticeable for the driver as changes in torque or changes in acceleration.

In addition, operating states between pure serial operation and normal operation are difficult to implement, because in normal operation the second electric machine is controlled as a generator and/or as a motor via a target torque, whereas in serial operation the second electric machine must be operated under current control. Significant problems arise when switching between the operating modes.

SUMMARY OF THE INVENTION

It is therefore the object of the invention to provide a method for controlling a drive of a vehicle of the aforementioned type, by way of which changes in torque that are noticeable by the driver can be reduced.

The invention proposes as a solution a method for controlling a drive of a vehicle with at least one first axle having at least one mounted wheel, wherein a drive torque is set by a driver of the vehicle and the first axle is driven by a first electric machine as a function of the drive torque, and wherein a second electric machine coupled to at least one combustion engine provides electrical energy for driving the first axle with the first electric machine. By taking into account the drive torque and machine parameters of at least the second electric machine, a set or precontrol torque associated with the second electric machine and the combustion engine is computed and the second electric machine and the combustion engine are each open-loop controlled based on the respective associated control torque or are closed-loop controlled based on the respective associated target torque. In addition, a vehicle with a controller configured to perform the method and a computer program product with a program for controlling the disclosed controller in accordance with the method is proposed. Further advantageous embodiments result from the features recited in the dependent claims.

In particular, the invention proposes a method, wherein by taking into account the drive torque as well as machine parameters of at least the second electric machine, a control or target torque associated with the second electric machine and with the internal combustion engine is computed, and wherein the second electric machine and the internal combustion engine are open-loop-controlled with respect to the control torque associated therewith or with respect to the closed-loop-controlled target torque associated therewith. If open-loop control is contemplated for the respective machines, a control torque is computed, whereas a target torque is computed when the machines are closed-loop controlled. Combinations can also be provided, for example when the electric machine is open-loop controlled, and the internal combustion engine is closed-loop controlled, or vice versa. Accordingly, a control torque for the electric machine and a target torque for the internal combustion engine are computed, or vice versa. An open-loop control or a closed-loop control can thus be provided individually for each machine. For example, a switchover may occur between open-loop control and closed-loop control depending on a drive situation. For example, the electric machine may be open-loop controlled at low rotational speeds and closed-loop controlled at high rotational speeds, and the like. A similar approach can be taken for the internal combustion engine. The control torque is used for open-loop control of the respective machine, whereas the target torque is used as reference variable for a closed-loop controller for closed-loop control of the respective machine.

With the invention, it is thus possible for the first time to avoid serially coupled individually closed-loop controls for the two electric machines and the internal combustion engine and replace these controls with common control basis. In this way in particular, the target torque at the end of the conventional control chain can be outputted significantly faster and more accurately. The reaction of the drive to changes can thus be significantly accelerated, thereby potentially significantly reducing undesirable effects of changes in torque, such as torque fluctuations or the like, on the drive torque. Preferably, such a closed-loop control can be implemented so that torque changes are no longer noticeable by the driver. In addition, the capacity of an existing energy storage device of the vehicle, which as a buffer must supply or receive energy in the event of control deviations during the adjusting process, can be at least reduced or even completely eliminated.

Accordingly, the vehicle of the generic type is characterized by an open-loop controller which is configured to perform the method of the invention. The open-loop controller may be formed by, for example, a processor unit, an electronic circuit implemented in hardware, combinations thereof and/or the like.

The invention further proposes a computer program product with a program for a processor unit, with program code sections of a program for performing the steps of a method according to the invention when the program is executed by the processor unit. The computer program product comprises additional computer-executable components, which when the program is executed on the processor unit serve to carry out the method according to the invention. The aforementioned computer program product may be embodied as a computer readable storage medium.

The drive of the vehicle includes at least a first axle with at least one wheel and preferably also a second axle with at least one wheel. In a particular advantageous embodiment, each axle is equipped at its ends with a respective wheel.

A driver of the vehicle may specify a drive torque by drive torque the vehicle is driven by the drive. The drive torque can be specified by the user by way of a pedal, for example, an accelerator pedal, or the like. In addition, the drive torque may of course also be specified by a speed control or the like.

The inventive concept makes it possible to shorten the control speed significantly, thereby preventing to a large extent oscillations in the region of the drive section caused by control characteristics. The stability of control can be improved.

The first and the second electric machine can be constructed as a direct current machine, as a three-phase machine or the like. In particular, the two electric machines can be construed identically. Preferably, a converter is provided for each electric machine, which is connected, on the one hand, to the respective electric machine and, on the other hand, to an intermediate circuit to which—if present— the battery of the vehicle is also connected. The inverters are each adapted to the type of the machine and its properties. The intermediate circuit is preferably built as a DC link circuit. The converter of a DC machine is therefore formed by a DC/DC converter. Preferably, the converters are designed for bidirectional operation, i.e. they are, on the one hand, able to draw energy from the intermediate circuit and supply the energy to each connected electric machine or are able transfer electrical energy, which is supplied by the respective electric machine, to the intermediate circuit. If, however, the first electric machine is operated only in motor mode and the second electric machine is operated only in generator mode, then the respective converters can have a simplified design wherein energy is allowed to flow only in one direction.

The internal combustion engine may be a conventional internal combustion engine for a motor vehicle, especially a passenger car, for example a motor vehicle operated with a fuel, such as gasoline, gas, diesel, or the like. The internal combustion engine can be coupled to the second electric machine via a shaft, which supplies mechanical energy from the combustion of the fuel to the second electric machine, which in turn converts the mechanical energy to electrical energy and supplies the same. The electrical energy supplied from the second electric machine is used for driving the first axle with the first electric machine.

According to one aspect of the invention, a target torque associated with the second electric machine and the internal combustion engine is computed, whereby the computation takes place by taking into account the drive torque as well as machine parameters of at least the second electric machine. Preferably, machine parameters of the first electric machine and/or of the internal combustion engine can additionally also be considered. The invention thus works around the conventional control chain and the control deviations resulting from its cascaded structure and the resulting problems, because the present invention, unlike the prior art, does not require to wait until all coupled control loops settle. In addition, the stability of the control can be significantly improved.

In particular, the torque caused by the second electric machine operating in generator mode is always known. A change—as long as the battery allows-can be adapted to the dynamics of the internal combustion engine. In addition, the invention allows achieving a quasi-smooth transition between the normal mode and the serial mode. The existing problem in the prior art can here be completely eliminated. In addition, the state of charge of the battery, if connected, can be controlled by the invention. Thus, it is possible to produce and/or keep a predetermined state of charge. In particular, the invention allows avoiding switching between a current control in serial mode and a torque control in normal operation.

According to an improvement of the invention, computing includes determining an operating current of the first electric machine so that the drive torque is at least partially provided by the first electric machine. This makes it possible to precisely define the drive torque or rather the part of the drive torque that is provided by driving with the first electric machine. Moreover, the determination of the operating current can be used to take into account further influences in the area of the electrical coupling, in particular of the intermediate circuit when computing of the target torque for the second electric machine and the internal combustion engine.

In particular, computing the target torque may take into account an energy demand of at least an additional electrical component of the vehicle connected to the electric machine. Such an electrical component may be, for example, an air conditioner, headlight, an audio system or the like. The energy demand is hence that of an electrical consumer. In addition, an electrical component supplying energy may be provided, for example a solar cell mounted on a vehicle roof, a fuel cell or the like. The target torque for the second electric machine and the internal combustion engine can then be computed by taking these energy demands into account. When the internal combustion engine is coupled exclusively with the second electric machine in generator mode, both of the target torques have an identical magnitude.

According to another embodiment of the invention, it is proposed to use an electrical energy storage device connected to the first and the second electric machine for compensating a control deviation during the settling time. Control deviations may occur during a feedback control process in which the closed-loop controller regulates an actual value to a desired value or corrects a disturbance value. In particular, the electrical energy storage device is for this purpose connected to the intermediate circuit, to which the corresponding inverters for the first and the second electric machine are also connected. For example, deviations in the electrical circuit may occur in particular during the settling or line-out period, which cause that the produced and consumed electrical energy not to be in equilibrium. The energy storage can be used for this purpose by temporarily storing a surplus of electrical energy or compensating a deficit of electrical energy by supplying electrical energy. This can not only improve the control characteristic according to the invention, but also further enhance the stability of control. The energy storage device may be formed, for example, by an accumulator or of a capacitor or a combination thereof. Of course, the energy storage may also be formed by the vehicle's battery. With the invention, the capacity of the electrical energy storage device can be selected to be very small compared to the prior art. With the design of the electrical energy storage device, a high closed-loop control speed can be achieved with the invention. The amounts of temporarily stored energy can then be very small.

According to another embodiment of the invention, the computation can be directed to minimize the capacity of an electrical energy storage device. The electrical energy storage can then be made very small and compact, thereby simplifying assembly and reducing cost. Preferably, the computation is based on an optimal closed-loop control. In this way, the dissipated energy differences can be minimized. Accordingly, the capacity of the electrical energy storage device can then be made very small.

According to an improvement of the invention, a second axle having at least one wheel is driven by the internal combustion engine coupled to the second electric machine. In this embodiment, the internal combustion engine is thus not only provided for driving the second electric machine in generator mode, but is also used to provide a portion of the drive torque through the second axle for driving the vehicle.

Accordingly, the drive torque for the drive of the vehicle is divided between the first electric machine and the internal combustion engine. Regarding the target torque of the internal combustion engine, it must be kept in mind that the internal combustion engine must provide, in addition to the portion of the drive torque, additionally at the same time also the corresponding torque for the second electric machine. The closed-loop control is accordingly adapted in this case.

According to another improvement, computing includes determining a target torque assigned to the first electric machine and controlling the first electric machine in closed-loop with respect to its associated target torque. This embodiment is based on splitting the drive torque between the internal combustion engine and the first electric machine. According to the splitting ratio, a target torque for the first electric machine is computed, which serves to control the first electric machine. This ensures a reliable and accurate distribution of the drive torque between the first electric machine and the internal combustion engine.

According to another embodiment, the second electric machine is operated exclusively in generator mode. This approach can not only reduce the complexity of the inverters, but a simplified electric machine specially designed for generator mode can also be used as the second electric machine, which reduces cost. Moreover, the overall closed-loop control according to the invention can be simplified, because a motor mode of the second electric machine need not be provided. This can further improve the reliability of the closed-loop control.

According to another embodiment, the machine parameters include efficiencies of the first electric machine, the second electric machine and/or the internal combustion engine. Taking into account at least one of the aforementioned efficiencies makes it possible to improve the accuracy of the closed-loop control. In particular, a settling process and/or a control deviation can be significantly reduced. Of course, other parameters may also be considered, for example, moments of inertia of the machines, response times of the internal combustion engine when increasing or reducing the fuel supply and/or the like.

BRIEF DESCRIPTION OF THE DRAWING

Further advantages and features are evident from the following description of an exemplary embodiment with reference to figures. In the figures, identical reference symbols indicate identical features and functions.

It is shown in.

DETAILED DESCRIPTION OF PREFERRED EMBODIMENTS

Figure 1:
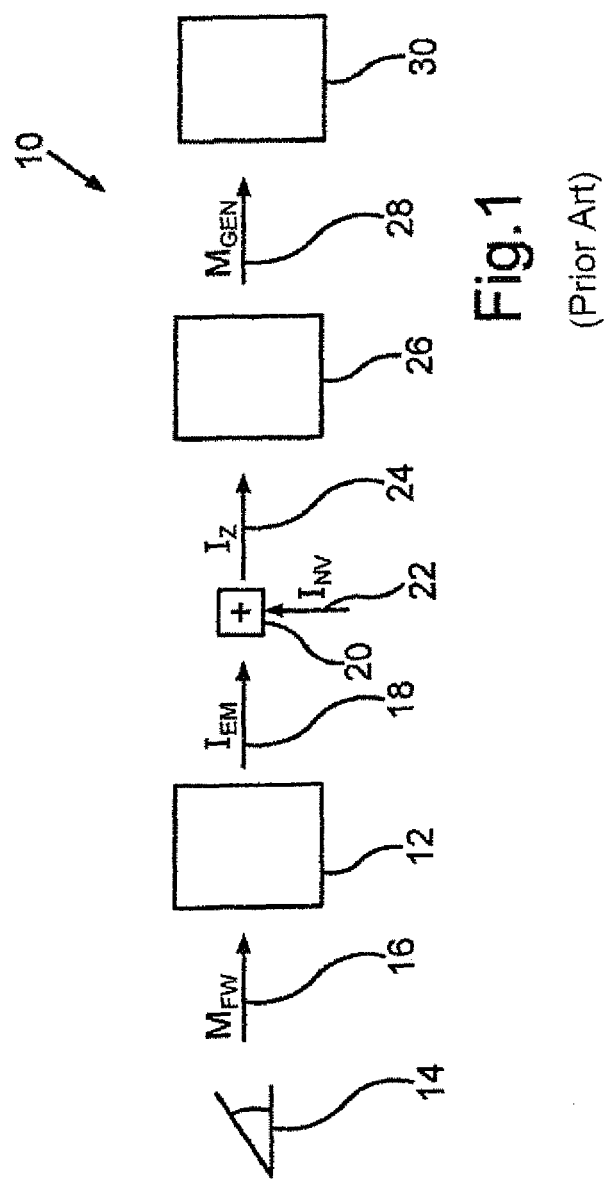
FIG. 1 a schematic flow diagram for a control system for a drive of a motor vehicle with an electrically driven axle according to the prior art, and FIG. 2 a schematic flow diagram for a control system of a drive of a vehicle according to the invention.

FIG. 1 shows schematically a flow diagram of a control device of a drive of a vehicle according to the prior art, wherein the drive together with the control device is designated by the reference numeral 10. The vehicle is a conventional motor vehicle, which is not shown in the figures. The vehicle has a first and a second axle, each axle having at its ends a wheel. FIG. 1 shows a pedal 14, which in the present example is embodied as a foot pedal designed to be operated by a driver to specify a target torque. The pedal 14 is thus an electromechanical converter which generates a signal corresponding to the actuation by the user and provides the signal to the drive. The signal represents a drive torque which is set by the driver of the vehicle. This drive torque $M_{FW}$ has the reference numeral 16 and is used to control a first electric machine 12, which drives the first axle of the vehicle under closed-loop control depending on the drive torque.

To generate the desired drive torque using the first electric machine 12, a current $I_{EM}$ 18 is provided which in the present example is a direct current of an intermediate circuit. The intermediate circuit thus provides the electrical energy for driving the electric machine 12. In addition, a secondary load is connected to the intermediate circuit at the reference numeral 20, which in the present example is formed by an air conditioner. The air conditioner itself, although not shown in FIG. 1, requires for its intended operation the current $I_{NV}$ 22. The two currents $I_{EM}$ 18 and $I_{NV}$ 22 constitute together the intermediate circuit current Iz 24 to be supplied by a generator 26. Accordingly, the generator requires a drive torque $M_{GEN}$ 28 which is provided by an internal combustion engine 30 in form of rotational energy. The internal combustion engine 30 is supplied with fuel according to the torque demand from the generator 26.

As seen from FIG. 1, several closed-loop controls are cascaded, namely a control loop for the first electric machine 12, and another control loop for the second electric machine 26 operated as a generator and for the internal combustion engine 30.

When the drive torque changes due to a change in the actuation of the pedal 14 by the user or due to a change in a current demand of the air conditioner, the closed-loop controls of the first and the second electric machine 12, 26 must adjust to the new conditions. At the same time, control fluctuations occur between the first and the second electric machine 12, 26 due to the independence of the corresponding closed-loop control. The same applies to the coupling of the second electric machine 26 with the internal combustion engine 30. In order to reduce corresponding fluctuations, large time constants are generally provided which causes a corresponding delay in the delivery of drive torque in the response to an actuation of the pedal 14. The same applies to changes in the demand for electrical energy by secondary consumers, such as the air conditioning. This causes torque oscillations while driving the vehicle.

Figure 2:
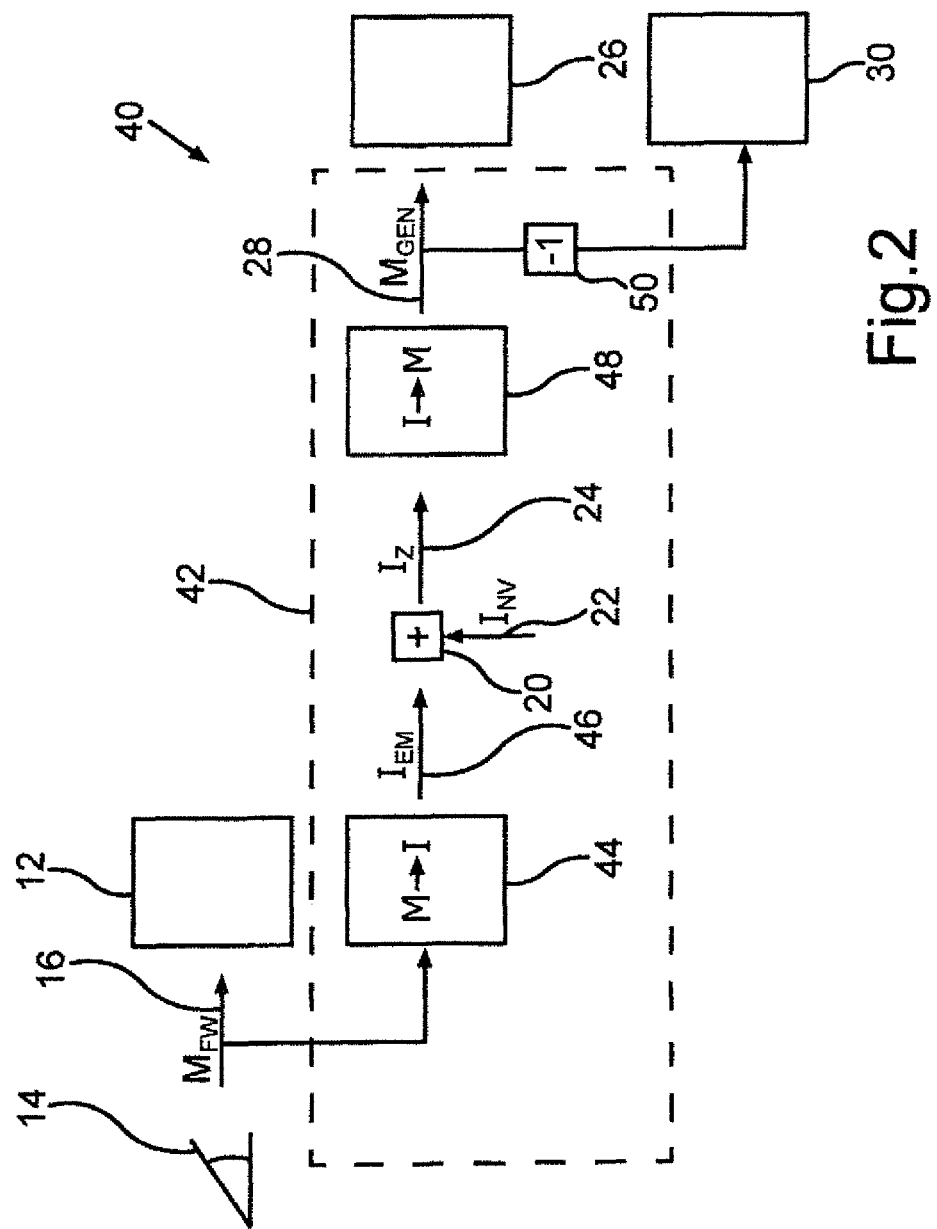

FIG. 2 shows schematically a flow diagram for a drive with an open-loop control according to the invention. The mechanical structure corresponds to the structure described with reference to FIG. 1, so that reference is made to the description of FIG. 1. Identical reference symbols again refer to identical functions and elements.

In contrast to FIG. 1, an open-loop controller 42 is provided according to FIG. 2, which is implemented here in the form of a processor unit (not illustrated in detail). Therefore, the structural elements shown in FIG. 2 hence characterize the function of the open-loop controller 42 and the corresponding processor unit, respectively.

It is again evident that a drive torque $M_{FW}$ 16 set by actuation of a pedal 14 by the user is provided to the first electric machine 12, which is used for closed-loop control of the first electric machine 12. At the same time, the drive torque $M_{FW}$ 16 is provided to the open-loop controller 42, which computes based on the provided drive torque $M_{FW}$ 16 using a first processor unit 44 a current $I_{EM}$ 46 of the first electric machine 12, that is required for the intended operation to generate the drive torque $M_{FW}$.

For this purpose, the first processor unit 44 uses the efficiency of the first electric machine 12 and also, if necessary, the efficiency of the associated inverter.

Thereafter, the electrical current consumption of secondary loads, such as the air conditioner is captured and—as already described with reference to FIG. 1—the current $I_z$ 24 of the intermediate circuit is computed. This is composed of the sum of the currents $I_{NV}$ 22 and $I_{FW}$ 46.

The current $I_z$ 24 is then processed in a second processor unit 48, wherein the processor unit 48 computes a target torque for the second electric machine 26 operated as a generator. The target torque is then supplied to the second electric machine and optionally to the corresponding inverter so that the second electric motor can be controlled to the given target torque. At the same time, the target torque is negated at 50, with the value then being fed to an unillustrated closed-loop control unit of the internal combustion engines 30. The inverter is designated with 50. In this way, the second electric machine 26 and the internal combustion engine 30 are closed-loop controlled in parallel to the same magnitude of the target torque, but with opposite sign.

In this way, overall a very fast control can be achieved. At the same time, the overall control tends to be less susceptible to oscillations, so that time constants of the control can be reduced. Overall, a particularly fast control possibility results, thus largely preventing torque changes noticeable to the driver.

The previously described exemplary embodiment is merely illustrative of the invention, but is not limiting. In particular, of course, features of the claims and the description can be combined in almost any way with each other in order to arrive at additional embodiments according to the invention. In addition, of course, device features can be implemented using appropriate method steps and vice versa.

The invention claimed is:

1. A method for controlling a drive of a vehicle having a first axle with at least one mounted wheel, comprising:
    setting by a driver a drive torque of the vehicle,
    driving the first axle with a first electric machine as a function of the drive torque,
    providing electrical energy with a second electric machine coupled to at least one combustion engine for driving the first axle with the first electric machine,
    driving a second axle having at least one mounted wheel with the at least one combustion engine that is coupled to the second electric machine in order to operate the second axle with both the at least one combustion engine and the second electric machine,
    computing, by taking into account the drive torque and machine parameters of at least the second electric machine, a target torque associated with the second electric machine and with the at least one combustion engine, and
    controlling the second electric machine and the at least one combustion engine in parallel to the associated target torque with identical magnitude, but reverse mathematical sign, while driving the first axle.

2. The method of claim 1, wherein the step of computing comprises determining an operational current of the first electric machine so that the drive torque is at least partially provided by the first electric machine.

3. The method of claim 1, wherein the step of computing comprises taking into account an energy demand of at least one additional electrical component of the vehicle connected to the first and second electric machines.

4. The method of claim 1, further comprising the step of compensating a control deviation during a settling process by using an electrical energy storage device connected to the first and second electric machines.

5. The method of claim 4, wherein the step of computing is executed to lower a capacity of the energy storage device to a level sufficient to effect a compact configuration of the energy storage device.

6. The method of claim 1, wherein the step of computing comprises determining of a target torque associated with the first electric machine, and controlling the first electric machine in relation to the target torque.

7. The method of claim 1, wherein the second electric machine is operated exclusively in generator mode.

8. The method of claim 1, wherein the machine parameters comprise efficiencies of at least one of the first electric machine, the second electric machine and the at least one combustion engine.

9. A vehicle comprising:
a drive having a first axle with at least one mounted wheel, a first electric machine coupled to the first axle, a combustion engine, and a second electric machine coupled at least to the at least one combustion engine for providing electrical energy for driving the first axle with the first electric machine,
a second axle having at least one mounted wheel configured to be driven by the combustion engine that is coupled with the second electric machine, in order to operate the second axle by using both the combustion engine and the second electric machine, and
a controller configured to
allow a driver to set a drive torque of the vehicle,
drive the at least one first axle with the first electric machine as a function of the drive torque,
provide electrical energy with the second electric machine coupled to the combustion engine for driving the first axle with the first electric machine,
drive the second axle having at least one mounted wheel with the combustion engine that is coupled to the second electric machine in order to operate the second axle with both the combustion engine and the second electric machine,
compute, by taking into account the drive torque and machine parameters of at least the second electric machine, a target torque associated with the second electric machine and with the combustion engine, and
control the second electric machine and the combustion engine in parallel to the associated target torque with identical magnitude, but reverse mathematical sign, while driving the first axle.

10. A computer program product embodied in a non-transitory computer-readable medium and comprising a program with program code sections, which enable a controller, when loaded into a memory of the controller, to execute the steps of the method of claim 1.

* * * * *